United States Patent Office 3,711,400
Patented Jan. 16, 1973

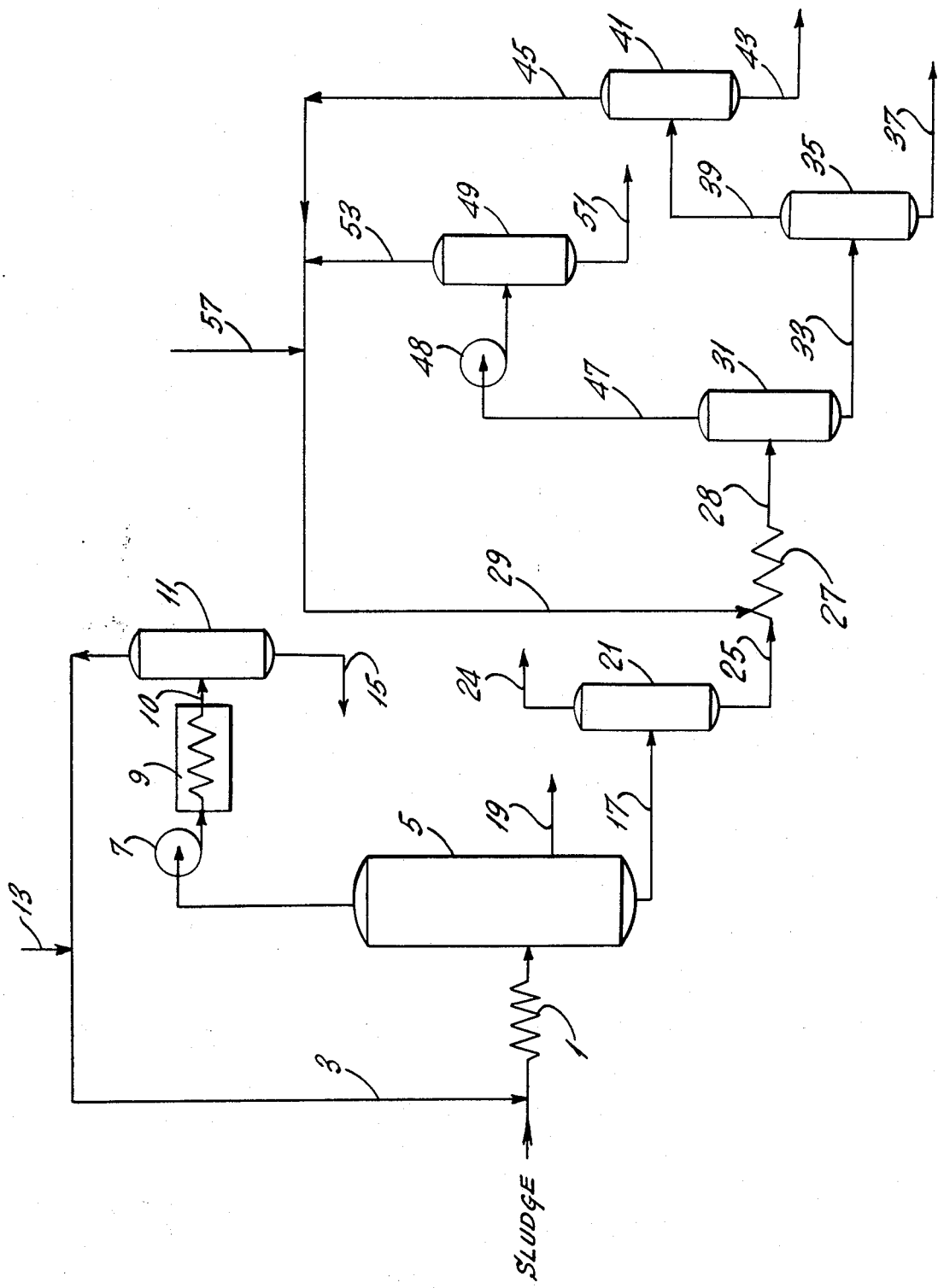

3,711,400
CONTINUOUS PROCESS FOR RECOVERING
WAXES FROM OILY SLUDGES
Edward L. Cole, Fishkill, and Howard V. Hess, Glenham, N.Y., assignors to Texaco Inc., New York, N.Y.
Filed Nov. 6, 1970, Ser. No. 87,452
Int. Cl. B01d 21/10, 11/04
U.S. Cl. 210—21
16 Claims

ABSTRACT OF THE DISCLOSURE

In the first stage of a continuous process oily sludges are mixed with light hydrocarbons differing substantially in specific gravity therefrom to separate the sludges into an oil-hydrocarbon phase and a water-waxy solids phase. The oil-hydrocarbon phase is heated to a temperature above the critical temperature of the light hydrocarbons to remove the light hydrocarbons which are then recycled for mixing with additional sludge and the oil is recovered for further use. The water-waxy solids phase is treated to obtain water of reduced Chemical Oxygen Demand which can be discharged in receiving bodies of water without polluting the same. The waxy solids-water slurry which remains is, in the second stage of the process of this invention, dried and the resulting dry waxy solids are treated with a light aromatic solvent, such as benezne, to yield a solution of wax and the aromatic solvent and wax-free solids. After the aromatic solvent wax solution is stripped to remove the aromatic solvent, a valuable wax product remains. In a final step, the wax-free solids are heated to remove the last traces of the aromatic solvent therefrom yielding dry, hydrocarbon-free, solids which are suitable for a wide variety of uses, such as, for example, for land fill.

BACKGROUND OF THE INVENTION

Field of the invention

This invention relates to a continuous two-stage process of deoiling, dewatering and dewaxing refinery sludges in which, in the first stage, the sludges are mixed with a light hydrocarbon followed by settling to give an oil-hydrocarbon phase and a water-waxy solids phase and in the second stage, waxy solids separated from the water-waxy solids phase are treated with an aromatic solvent to yield a wax-aromatic solvent extract from which the petroleum wax contained therein is recovered.

DESCRIPTION OF THE PRIOR ART

The contents of sludges occurring in refineries consists of sediments from the bottom of tanks, waste chemicals, emulsions, sand, clay, catalyst, rust generated over sometimes several years, as well as water and oil. The very nature of the contents has made it difficut over the years to economically deoil and dewater such sludges for reuse or for pollution-free disposal. Thus, the use of both benzene and naphthas with added water in attempts to deoil sludges has been found economically unattractive because of the poor settling characteristics of the resulting mass made centrifuging necessary. Similarly, attempts to deoil and break sludges of the present type with iso-octane and a gas oil were also not successful because the oil phase and the water solids phase did not separate. Further, existing processes known in the art have not provided any method for recovering the valuable wax product associated with the inorganic solids removed from such refinery sludges.

SUMMARY OF THE INVENTION

It has now been discovered that by contacting refinery sludges first with light hydrocarbons it is possible to obtain excellent phase separation with attendant deoiling of the waxy solids and separation of the oil-hydrocarbon phase from the water-waxy solids phase. On settling, the water-waxy solids phase separates into a water phase of reduced Chemical Oxygen Demand (COD) and a waxy solids-water slurry. Likewise, it has been discovered that the waxy solids-water slurry can be dried and the resulting dry waxy solids treated with an aromatic solvent, such as benzene, to yield a solvent-wax extract and wax-free solids. Stripping of the aromatic solvent from the wax-solvent solution yields valuable petroleum products while heating of the wax-free solids yields a dry, hydrocarbon-free solids material suitable for a wide variety of uses, including land fill. In the first stage of this process centrifugation is not required and settling and decanting effect separation of the oil-hydrocarbon from the water-waxy solids phase.

Light hydrocarbons suitable for use in the first stage of this invention include aliphatic hydrocarbons such as propane, butane, pentane, as well as mixtures and isomers thereof. The volume ratio of the light hydrocarbons to sludge on a liquid basis may range from about 3 to 1 to about 20 to 1 and preferably from about 4 to 1 to about 8 to 1. The recovered oil is clean and suitable for feeding to a catalytic cracking unit, or may be blended in fuel oils.

Light aromatic solvents useful in treating the waxy solids in the second stage of this process include low molecular weight aromatics such as benzene, toluene, xylene, ethyl benzene, cumene, isopropyl benzene, t-butyl benzene, mesitylene, etc. and mixtures and isomers thereof. The volume ratio of the light aromatic solvent to the waxy solids may be varied over a wide range, however, generally, it will be from about 5:1 to about 30:1 and, preferably, from about 8:1 to about 20:1.

The petroleum wax recovered from the wax-aromatic solvent extract in the second stage of this process can be decolorized by the standard processing techniques of clay percolation and steaming etc., to yield valuable microcrystalline and distillate paraffin waxes. The dry, hydrocarbon-free solids recovered from the second stage of the process are suitable for land fill and a variety of other uses.

Further details of the subject process become more readily apparent from the following description taken together with the accompanying drawing, the single figure of which is a schematic view illustrating in non-limiting fashion a practical embodiment of the two-stage process of this invention.

DETAILED DESCRIPTION OF THE INVENTION

As shown in the figure, refinery sludge and light hydrocarbon (i.e., light aliphatic hydrocarbon) from line 3 are mixed in mixing area 1 from which they flow into a settling area, such as drum 5. Here the mixture of hydrocarbon and oil previously contained in the sludge flows to the top while the water and the waxy solids settle to the bottom. Upon further standing, the water-waxy solids phase separates to give a water phase and a waxy solids-water slurry. The water, which has a considerably reduced Chemical Oxygen Demand (COD) is taken off through line 19 for possible further reduction in COD in a biological section, such as an activated sludge tank.

The temperature in mixer 1 and drum 5 is maintained below the critical temperature of the light hydrocarbon, preferably at about 70 to 120° F. and at a pressure of about 10 to about 150 p.s.i.g. Maintaining a constant warm temperature, for example, about 90° F. under sufficient pressure facilitates separation of the phases in settling drum 5.

The light hydrocarbon-oil top layer from settling drum 5 is pumped through line 6 by pump 7 into a heating area, such as heater 9, which is sufficiently heated to raise the temperature of the stream above the critical temperature of the particular light hydrocarbon which has been used as a separating medium and generally this temperature will be about 275°–390° F. Next, the hot, light hydrocarbon-oil mixture passes through line 10 into a fractionating area such as tower 11, where an oil phase poor in light hydrocarbon is taken off the bottom through line 15 while a dense phase light hydrocarbon which is oil-poor comes off the top through line 3 for recycling and mixing with fresh sludge after cooling and depressurizing. While the hydrocarbon is in residence in the heater 9, line 10 and tower 11 sufficient pressure is maintained thereon to keep it in a dense phase, or about 500 to 600 p.s.i.g. The oil coming off line 15 is substantially free of light hydrocarbon and can be sent to other portions of the refinery such as the crude stills or, after stabilization for flash point, can be blended directly with fuel oil. Any light hydrocarbon lost in the process can be made up by addition to the system through line 13.

In the second stage of the process of this invention as shown in the figure, the water-waxy solids slurry passes through line 17 into drier 21 where it is heated with steam entering through line 23, to effect removal of the water and any light hydrocarbon which is exhausted overhead from drier 21 via line 24. The dry, waxy liquid-inorganic solids stream maintained at a temperature above about 200° F. is taken off the bottom of drying tower 21 through line 25 and is sent to mixing area 27 where it is mixed with recycle benzene entering the said mixing area through line 29. The mixed materials then flow through the line 28 into a settling area such as drum 31. From drum 31 the wax-aromatic solvent solution is pumped by means of pump 48 through line 47 to a second fractionating area, such as stripping column 49. From the top of stripping column 49 benezne for recycling to the process after cooling and condensing, is taken off through line 53 while molten wax is withdrawn through line 51 and sent to an appropriate recovery unit. Such recovery operations can include percolation through a clay bed followed by steaming to yield a decolorized microcrystalline wax, distillate paraffin wax, or a mixture of the two. Wax-free solids from settler 31 are taken off through line 33 and sent to drier 35 where the solids are steamed to remove any trace of the aromatic solvent. Overhead from the drier 35 there is taken off through line 39 a water-aromatic solvent stream which is passed into a third distillation area, such as decanter 41. Benzene taken off from decanter 41 as the overhead product via line 45 is recycled to mixing area 27 via line 29 after cooling and condensing while water is withdrawn from the decanter 41 as the bottoms product via line 43. Make-up aromatic solvent, as required, is added through line 57. The dry, hydrocarbon-free, free-flowing solids leaving the drier 35 are conveyed to an appropriate storage area or placed directly on the land.

In the first step of the process in the heating and fractionating areas, the operating conditions are as follows for the various light hydrocarbons:

| Light hydrocarbons | Temperature, °F. | Pressure, p.s.i.g. |
| --- | --- | --- |
| n-C$_4$ | 306–320 | 550–600 |
| i-C$_4$ | 275–300 | 550–600 |
| n-C$_5$ | 390–420 | 500–550 |
| i-C$_5$ | 375–400 | 500–550 |
| Neo-C$_5$ | 370–400 | 500–550 |

In the following examples, and throughout the specification, the term "Chemical Oxygen Demand," abbreviated "COD," is used in the usual sense. Thus COD denotes the total oxidizable material present in the liquid under consideration regardless of whether or not it is biodegradable. BOD tests, on the other hand, denote the amount of oxygen consumed during a five day period of bacterial activity at 20° C. on a chemically standardized and stabilized sample. Although COD is not strictly comparable to the biological oxygen demand (BOD), it is believed sufficiently useful as an indication of reduction of BOD to provide a basis for comparison of the effectiveness of alternate methods of treatment, particularly when applied to comparable waste samples.

Table 1 below gives the analysis of a typical sludge which can be treated by the process of this invention:

TABLE 1

| Sample | Crude tank bottoms sludge |
| --- | --- |
| COD, mg. O$^2$/l | >615,000 |
| Oil, weight percent | 24.8–28.7 |
| Water, weight percent | 20.5 |
| Ash, weight percent | 7.35 |
| pH | 7.5 |

Sludges of this type are non-uniform and it is difficult to obtain a representative sample.

The following examples set forth various embodiments of the present invention and are to be considered not limitative:

EXAMPLE I 1,600 ml. of pentane was placed in a separatory funnel and 200 grams of the Crude Tank Bottoms Sludge, described above, gravity one gram/ml. was added. After vigorous shaking, two phases appeared which were allowed to settle overnight. The clear top phase was decanted from the slurry bottoms. The bottom phase was vacuum filtered and the filtrate combined with the top layer following which the pentane was removed by evaporation. Pentane and water were stripped from the filter cake by heating on a steam plate. The following was noted:

FIRST STAGE OF PROCESS

| Sample | 35A, stripped top layer (oil) | 35B, dry sludge layer |
| --- | --- | --- |
| Weight of product, grams | 32 | 64 |
| Yield, weight percent basis charge | 16 | 32 |
| Carbon, weight percent | | 59 |
| Specific gravity, 60/60° F | 0.8772 | |
| Kinematic viscosity, 100° F., cs | [1] 11.77 | |

[1] 65.2 S.U.S.

SECOND STAGE OF PROCESS 25 grams of Sample 35B above was mixed and extracted with a total of 355 ml. of benzene at a temperature of 75° F. The benzene extract (i.e., benzene-solubles phase) was separated from the solid benzene insolubles phase by decantation. Evaporation of the benzene from the benzene-solubles phase gave microcrystalline wax as a product. Finally, the benzene-insolubles were heated on a steam plate to strip off the residual benzene giving a clean-appearing, oil-free, free-flowing solids product. The following observations were made:

| Sample (benzene-free) | 73A, benzene-solubles | 73C, benzene-insolubles |
| --- | --- | --- |
| Weight recovered, grams | 19.8 | 4.2 |
| Weight percent, basis charge | 82.5 | 16.8 |
| Melting point, °F | [1] 192 | |
| Carbon, weight percent | | 19.9 |
| Ash, weight percent | | 81.4 |

[1] Wax.

EXAMPLE II

In this example, 1,600 ml. of n-pentane and 200 ml. of the same Crude Tank Bottoms Sludge treated in Example I were added to a separating funnel. The mixture was shaken vigorously, and the two phases which formed were allowed to settle overnight. The clear top layer weighing 857 grams was removed by decantation and the bottom layer remaining weighed 507 g. The following data were collected:

FIRST STAGE OF PROCESS

| Sample | 46A, top layer | 46C, bottom layer |
|---|---|---|
| Pentane free, weight grams | 56 | 140 |
| Water free, weight grams | 56 | 83 |
| Yield, weight percent basis charge | 28 | 41.5 |
| Free carbon, weight percent | | 62.4 |
| Ash, weight percent | | 16.6 |
| Specific gravity 60/60° F | 0.8763 | |
| Kinematic viscosity, 100° F., cs | [1] 9.71 | |

[1] 57.9 S.U.S.

SECOND STAGE OF PROCESS 25 grams of Sample 46C was extracted with a total of 225 ml. of benzene at about 85° F. The benzene extract (i.e., benzene-soluble phase) was separated from the solid benzene-insolubles phase by decantation. Evaporation of the benzene from the benzene-solubles phase gave microcrystalline wax as the product. Pertinent data relating to the second stage operations are shown below:

| Sample (benzene-free) | 60A, benzene-solubles | 60C, benzene-insolubles |
|---|---|---|
| Weight recovered, grams | 18.4 | 4.8 |
| Weight percent, basis charge | 73.6 | 19.2 |
| Melting point, °F | [1] 192 | |
| Carbon, weight percent | | 10.8 |
| Ash, weight percent | | 78.5 |

[1] Wax.

EXAMPLE III

A total of 1,600 ml. of n-pentane and 200 grams of the same sludge sample employed in Example I were placed in a separatory funnel and shaken vigorously for several hours after which the two phases which separated were allowed to settle overnight. The clear top phase (899 g.) were decanted from the bottom phase (375 g.) and both phases were heated on a steam plate to evaporate the n-pentane and water. The following observations were made:

FIRST PHASE OF PROCESS

| Sample | 69H, stripped top layer | 69C, stripped bottom layer |
|---|---|---|
| Weight of product, grams | 56 | 72 |
| Yield, weight percent basis charge | 28 | 36 |
| Ash, weight percent | | 16.2 |
| Sulfur, weight percent | 1.70 | 2.7 |
| Specific gravity, 60/60° F | 0.9150 | |

SECOND STAGE OF PROCESS 15 grams of Sample 69C was extracted with a total of 350 ml. of benzene at about 80° F. The benzene-solubles phase was recovered by decantation following which the benzene was removed by evaporation yielding a microcrystalline wax. The benzene-insolubles phase was heated on a steam plate in order to remove benzene leaving behind a free-flowing, clean-looking, oil-free, solids product. Data relating to the second stage operation are set out below:

| Sample (benzene-free) | 69D, benzene-solubles | 69E, benzene-insolubles |
|---|---|---|
| Weight recovered, grams | 11 | 3.4 |
| Weight percent, basis charge | 73.3 | 22.7 |
| Melting point, °F | [1] 190 | |
| Carbon, weight percent | | 23.3 |
| Ash, weight percent | | 67.9 |

[1] Wax.

The data in Examples I–III are summarized in Table 2 below:

TABLE 2

[Yield summary—deoiling, dewatering and dewaxing crude tank bottoms sludge—Basis charge, weight percent]

| Example | I | II | III |
|---|---|---|---|
| Oil | | 28.0 | 28.0 |
| Wax | 26.4 | 30.6 | 26.4 |
| Clay-type solids | 5.4 | 8.0 | 8.2 |
| Total | | 66.6 | 62.6 |

The difference between the total and 100 percent is due to the water rejected in Stage 1 of the process. This water would be returned to the biological section of the waste water treating plants.

The recovered oil obtained in the first phase of the novel process of this invention is clean and suitable for incorporation in feed to a catalytic cracker, crude stills or it may be blended in fuel oils.

The deoiled and dewaxed solids are not oily to the touch and after drying are clean-appearing and free flowing. These solids are suitable for land fill, etc., since unlike the sludge from which they are derived, they do not contaminate adjacent areas with oils as water-oil emulsions.

The high average recovery of oil obtained in the first stage makes it appear that the value of the oil alone may be sufficient to pay for the process and make it profitable.

Although in the examples in this specification the wax product recovered is a microcrystalline wax, the method of this invention is not restricted to the recovery of this particular type of wax. Sludges containing both distillate paraffin waxes including the normal paraffin waxes, the isoparaffin waves and the naphthenic waxes as well as microcrystalline waxes together with mixtures of these two general classes of waxes can be efficiently processed using the method of this invention and high recovery of the valuable wax products contained therein can be conveniently achieved.

What is claimed is:

1. A method for deoiling, dewatering and dewaxing sludges which comprises: (1) in a first stage mixing said sludges with a light aliphatic hydrocarbon having a substantially lower specific gravity than said sludges, separating the resulting mixture into water having a reduced Chemical Oxygen Demand, a water-waxy solids slurry phase and an oil-aliphatic hydrocarbon phase, heating said oil-hydrocarbon phase to a temperature above the critical temperature of said aliphatic hydrocarbon under a pressure sufficient to keep said aliphatic hydrocarbon in a dense phase whereby said oil-aliphatic hydrocarbon phase is split into an aliphatic hydrocarbon portion and an oil portion, recovering the said aliphatic hydrocarbon and oil therefrom, and (2) in second stage separating water from the water-waxy solids slurry, mixing the resulting waxy solids phase with a light aromatic hydrocarbon solvent, separating the resulting mixture into a wax-aromatic hydrocarbon solvent phase and wax-free solids, and recovering the said wax from the wax-aromatic hydrocarbon solvent phase.

2. A continuous process as defined in claim 1, wherein said aliphatic hydrocarbon recovered from the oil-hydrocarbon phase is recycled for mixing with additional sludge.

3. The continuous process as defined in claim 2, wherein additional light hydrocarbons are added to the recycled hydrocarbon.

4. The process as defined in claim 1, wherein said aliphatic hydrocarbon is selected from the group consisting of propane, butane, pentane and mixtures and isomers thereof.

5. The process as defined in claim 1 wherein the volume ratio of the aliphatic hydrocarbon to sludge on a liquid basis ranges from about 3:1 to about 20:1.

6. The process as defined in claim 1 wherein the volume ratio of the aliphatic hydrocarbon to sludge on a liquid basis ranges from about 4:1 to about 8:1.

7. The process according to claim 1 wherein said water which is separated in the first stage is treated biologically to further reduce its Chemical Oxygen Demand.

8. The process as defined in claim 1 wherein said aliphatic hydrocarbon is distilled from said oil-hydrocarbon phase.

9. The process as defined in claim 1 wherein the light aromatic hydrocarbon solvent is selected from the group consisting of benzene, toluene, xylene, ethyl benzene, cumene, isopropyl benzene, tertiary butyl benzene, mesitylene and mixtures and isomers thereof.

10. The process as defined in claim 1 wherein the light aromatic hydrocarbon is benzene.

11. The process as defined in claim 1 wherein the light aromatic hydrocarbon is recovered from the wax-aromatic hydrocarbon solvent phase by distillation.

12. The process as defined in claim 1 wherein the volume of the light aromatic hydrocarbon solvent to the waxy solids ranges from about 5:1 to about 30:1.

13. The process as defined in claim 1 wherein the volume ratio of the light aromatic hydrocarbon solvent to the waxy solids ranges from about 8:1 to about 20:1.

14. The process as defined in claim 1 wherein the said recovered light aromatic hydrocarbon is recycled for mixing with an additional quantity of the waxy solids.

15. The process as defined in claim 1 wherein the said wax-free solids are heated to effect substantially complete removal therefrom of the light aromatic solvent.

16. The process as defined in claim 1 wherein the water is removed from the water-waxy solids slurry by heating with steam.

References Cited

UNITED STATES PATENTS

| | | | |
|---|---|---|---|
| 2,039,636 | 5/1936 | Dillon et al. | 210—71 X |
| 2,730,190 | 1/1956 | Brown et al. | 210—84 X |
| 2,078,992 | 5/1937 | Banks et al. | 210—71 X |
| 2,724,731 | 11/1955 | Finnlay | 210—21 X |
| 2,825,678 | 3/1958 | Jahnig et al. | 210—21 X |
| 3,368,876 | 2/1968 | Bailey, Jr. | 210—21 X |
| 3,481,713 | 12/1969 | Titus | 210—21 X |

JOHN ADEE, Primary Examiner

U.S. Cl. X.R.

210—67, 71, 73; 210—83